US009967789B2

(12) United States Patent
Asada

(10) Patent No.: US 9,967,789 B2
(45) Date of Patent: May 8, 2018

(54) WIRELESS TERMINAL, WIRELESS COMMUNICATION SYSTEM, HANDOVER METHOD AND RECORDING MEDIUM

(71) Applicant: NEC Corporation, Tokyo (JP)

(72) Inventor: Shiro Asada, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days. days.

(21) Appl. No.: 14/768,062

(22) PCT Filed: Feb. 19, 2014

(86) PCT No.: PCT/JP2014/000836
§ 371 (c)(1),
(2) Date: Aug. 14, 2015

(87) PCT Pub. No.: WO2014/129183
PCT Pub. Date: Aug. 28, 2014

(65) Prior Publication Data

US 2016/0007253 A1 Jan. 7, 2016

(30) Foreign Application Priority Data

Feb. 25, 2013 (JP) ................................ 2013-034648

(51) Int. Cl.
*H04W 36/00* (2009.01)
*H04W 36/30* (2009.01)
(Continued)

(52) U.S. Cl.
CPC ........ *H04W 36/0094* (2013.01); *H04B 7/024* (2013.01); *H04W 36/30* (2013.01); *H04W 36/32* (2013.01); *Y02B 60/50* (2013.01)

(58) Field of Classification Search
CPC ..... H04W 88/02; H04W 88/08; H04W 24/10; H04W 24/02
See application file for complete search history.

(56) References Cited

U.S. PATENT DOCUMENTS 6,564,057 B1 5/2003 Chun
6,792,276 B1 * 9/2004 Butovitsch ............ H04W 16/02 455/438

(Continued)

FOREIGN PATENT DOCUMENTS

CN 101754314 6/2010
CN 101873657 10/2010

(Continued)

OTHER PUBLICATIONS

International Search Report PCT/JP2014/000836 dated May 20, 2014.

(Continued)

*Primary Examiner* — Khalid Shaheed
(74) *Attorney, Agent, or Firm* — Young & Thompson

(57) ABSTRACT

A wireless communication system includes a wireless terminal and a neighboring base station capable of performing coordinated multi point transmission. The wireless terminal includes a path-loss comparison unit comparing a first path loss, including a path loss between the wireless terminal and the current serving base station, with a second path loss, including a path loss between the wireless terminal and the neighboring base station; a distance comparison unit comparing a first distance, including a distance between the wireless terminal and the current serving base station, with a second distance, including a distance between the wireless terminal and the neighboring base station; and a control unit performing handover from the current serving base station to the neighboring base station, if at least either the second path loss is smaller than the first path loss or the second distance is shorter than the first distance.

8 Claims, 4 Drawing Sheets

10
18
12
14
16

(51) Int. Cl.
*H04B 7/024* (2017.01)
*H04W 36/32* (2009.01)

(56) References Cited

U.S. PATENT DOCUMENTS

| | | | | |
|---|---|---|---|---|
| 8,892,099 | B2 | 11/2014 | He | |
| 2003/0053413 | A1* | 3/2003 | Sawahashi | H04B 1/692 370/208 |
| 2004/0266474 | A1* | 12/2004 | Petrus | H04W 455/525 |
| 2007/0032237 | A1 | 2/2007 | Chang | |
| 2009/0203380 | A1 | 8/2009 | Park | |
| 2012/0028676 | A1 | 2/2012 | He | |
| 2012/0082058 | A1 | 4/2012 | Gerstenberger | |
| 2012/0213092 | A1* | 8/2012 | Sun | H04W 52/244 370/248 |
| 2012/0302174 | A1* | 11/2012 | Watanabe | H04W 56/0065 455/67.11 |
| 2013/0021929 | A1* | 1/2013 | Kim | H04B 7/024 370/252 |
| 2013/0143567 | A1 | 6/2013 | Hosono et al. | |
| 2013/0165122 | A1 | 6/2013 | Tanaka | |
| 2013/0176874 | A1* | 7/2013 | Xu | H04W 52/242 370/252 |
| 2014/0105136 | A1* | 4/2014 | Tellado | H04L 5/0058 370/329 |
| 2015/0080047 | A1* | 3/2015 | Russell | H04W 52/247 455/522 |
| 2015/0105029 | A1* | 4/2015 | Russell | H04W 4/023 455/67.11 |

FOREIGN PATENT DOCUMENTS

| | | |
|---|---|---|
| JP | 2002-271832 | 9/2002 |
| JP | 2009-267747 | 11/2009 |
| JP | 2010-109534 | 5/2010 |
| JP | 2010-537520 | 12/2010 |
| JP | 2011-259043 | 12/2011 |
| JP | 2012-015838 | 1/2012 |
| WO | 9934627 | 7/1999 |
| WO | 2012020457 | 2/2012 |

OTHER PUBLICATIONS

Extended European Search Report dated Sep. 28, 2016; Application No. 14753916.7.

Chinese Official Action—201480010484.6—dated Dec. 13, 2017.

* cited by examiner

WIRELESS TERMINAL, WIRELESS COMMUNICATION SYSTEM, HANDOVER METHOD AND RECORDING MEDIUM

TECHNICAL FIELD

The present invention relates to a wireless terminal, a wireless communication system, a handover method and a recording medium, in which handover between a plurality of base stations is performed.

BACKGROUND ART

In a general wireless communication system, at an edge part of a cell of a certain base station, the cell overlaps with that of a neighboring base station. In such an area where two or more cells overlap, interference may occur between radio waves from respective ones of the corresponding base stations. If such radio wave interference occurs, it results in deterioration in the quality of received signals, for example, SINR (Signal to Interference and Noise power Ratio). Accordingly, the certain base station comes to have no choice but to change the modulation method from that for high speed communication to that for medium to low speed communication. Therefore, a wireless communication system including a plurality of base stations has a problem in that the communication throughput may be reduced when a wireless terminal is present near a cell edge.

In this respect, in wireless communication systems such as of LTE-Advanced and WiMAX 2 (WiMAX is a trademark or registered trademark of the WiMAX Forum), "multi-base-station cooperative transmission technology" (may be referred to also as a distributed downlink coordinated multipoint framework or as coordinated multipoint transmission and reception) including such as a multi-base-station cooperative MIMO (Patent Literature 1) and a CoMP has been proposed. In the multi-base-station cooperative transmission technology, the same data is sent at the same timing from a plurality of base stations (the serving base station and its one or more neighboring base stations). A transmit diversity is thereby realized, and accordingly, the downlink throughput at the cell edges is improved.

In the above description, LTE is the abbreviation of Long Term Evolution. WiMAX is the abbreviation of Worldwide Interoperability for Microwave Access. MIMO is the abbreviation of Multiple Input Multiple Output. CoMP is the abbreviation of Coordinated Multiple Point.

Patent Literature 2 describes a base station which continuously manages the status of load such as the number of mobile terminals connected at each frequency. If a load condition is satisfied for one frequency and not satisfied for another frequency, the base station of Patent Literature 2 performs handover on the initiative of the base station, for load distribution.

CITATION LIST

Patent Literature

[Patent Literature 1] Japanese translation of PCT international application No. 2010-537520 (pages 9 and 12 to 13)

[Patent Literature 2] Japanese Patent Application Laid-Open No. 2012-015838 (pages 6 and 7)

SUMMARY OF INVENTION

Technical Problem

If the multi-base-station cooperative transmission is performed, the difference in quality of downlink signals (for example, SINR or CINR) becomes almost zero between the base stations (the serving base station and its neighboring base station), and accordingly, there is generated a situation where handover is hardly performed. In the above description, CINR is the abbreviation of Carrier to Interference and Noise Ratio.

As a result, even when the environment has become one where uplink signals reach to the neighboring base station in better condition than to the serving base station, if the multi-base-station cooperative transmission is in execution at that time, it is possible that handover from the serving base station to the neighboring base station is not performed, as described above. The uplink signals' reaching in better condition makes it possible to expect improvement in the uplink throughput and reduction in power consumption of a wireless terminal. However, as a result of that handover comes to be hardly performed, it becomes likely that the above-described effects, which intrinsically are to be achieved, become unable to be achieved.

Patent Literature 2 describes handover. However, Patent Literature 2 describes nothing about handover in a wireless communication system currently performing a multi-base-station cooperative transmission process. Therefore, it is impossible, by means of a technology of Patent Literature 2, to solve the above-described problem (the problem arising from that handover comes to be hardly performed when a multi-base-station cooperative transmission process is in execution).

The present invention has been made in order to solve the above-described problem, and accordingly, its objective is to provide a wireless terminal, a communication system, a handover method and a recording medium, all of which can achieve at least either improvement in the uplink throughput or reduction in power consumption at a wireless terminal, in a wireless communication system including a wireless terminal communicating with both the current serving base station and its neighboring base station which are capable of performing multi-base-station cooperative transmission.

Solution to Problem

A wireless terminal of the present invention is a wireless terminal configured to communicate with both a current serving base station and a neighboring base station which are capable of performing coordinated multi point transmission, which comprises: a path-loss comparison means for comparing a first path loss which comprises a path loss between the wireless terminal and the current serving base station with a second path loss which comprises a path loss between the wireless terminal and the neighboring base station; a distance comparison means for comparing a first distance which comprises a distance between the wireless terminal and the current serving base station with a second distance which comprises a distance between the wireless terminal and the neighboring base station; and a control means for performing handover from the current serving base station to the neighboring base station, if at least either a first condition that the second path loss is smaller than the first path loss or a second condition that the second distance is shorter than the first distance is satisfied.

A wireless communication system of the present invention includes a wireless terminal, and also includes a current serving base station and a neighboring base station which are capable of performing coordinated multi point transmission to the wireless terminal, wherein the wireless terminal comprises: a path-loss comparison means for comparing a first path loss which comprises a path loss between the wireless terminal and the current serving base station with a second path loss which comprises a path loss between the wireless terminal and the neighboring base station; a distance comparison means for comparing a first distance which comprises a distance between the wireless terminal and the current serving base station with a second distance which comprises a distance between the wireless terminal and the neighboring base station; and a control means for performing handover from the current serving base station to the neighboring base station, if at least either a first condition that the second path loss is smaller than the first path loss or a second condition that the second distance is shorter than the first distance is satisfied.

A handover method of the present invention is a handover method for a wireless terminal configured to communicate with both a current serving base station and a neighboring base station which are capable of performing coordinated multi point transmission, which comprises: comparing a first path loss which comprises a path loss between the wireless terminal and the current serving base station with a second path loss which comprises a path loss between the wireless terminal and the neighboring base station; comparing a first distance which comprises a distance between the wireless terminal and the current serving base station with a second distance which comprises a distance between the wireless terminal and the neighboring base station; and, if at least either a first condition that the second path loss is smaller than the first path loss or a second condition that the second distance is shorter than the first distance is satisfied, performing handover from the current serving base station to the neighboring base station.

A recording medium of the present invention stores a handover program for causing a computer, of a wireless terminal communicating with both a current serving base station and a neighboring base station which are capable of performing coordinated multi point transmission, to execute: a process of comparing a first path loss which comprises a path loss between the wireless terminal and the current serving base station with a second path loss which comprises a path loss between the wireless terminal and the neighboring base station; a process of comparing a first distance which comprises a distance between the wireless terminal and the current serving base station with a second distance which comprises a distance between the wireless terminal and the neighboring base station; and a process of performing handover from the current serving base station to the neighboring base station, if at least either a first condition that the second path loss is smaller than the first path loss or a second condition that the second distance is shorter than the first distance is satisfied.

Advantageous Effects of Invention

According to the present invention, in a wireless communication system including a wireless terminal communicating with both the current serving base station and its neighboring base station which are capable of performing multi-base-station cooperative transmission, it becomes possible to achieve at least either improvement in the uplink throughput or reduction in power consumption at the wireless terminal.

DESCRIPTION OF EMBODIMENT

First Exemplary Embodiment

Figure 1:
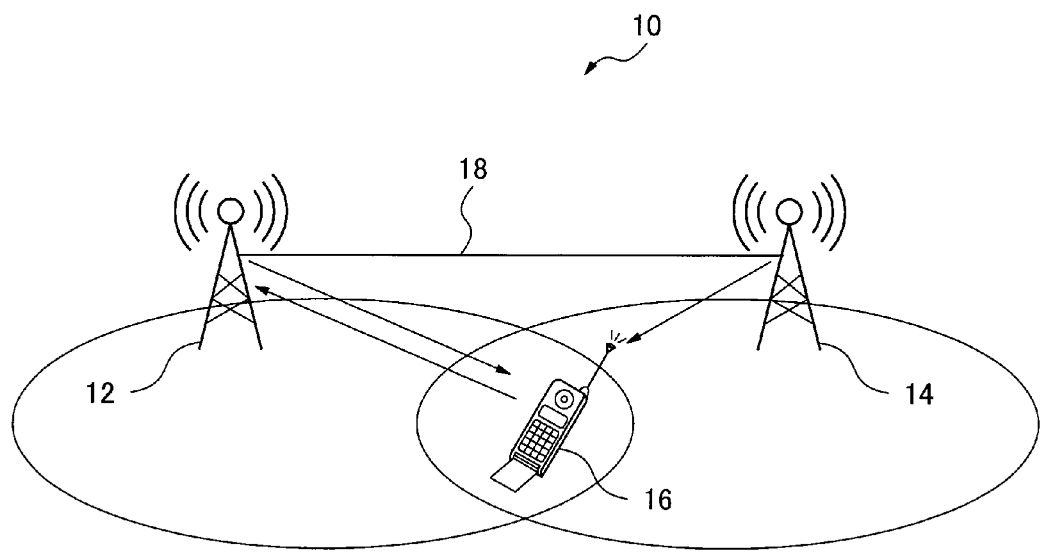
FIG. 1 a system configuration diagram showing an example of a wireless communication system according to a first exemplary embodiment of the present invention FIG. 2 a block diagram showing an example of a configuration of a wireless terminal shown in FIG. 1

FIG. 1 is a system configuration diagram showing an example of a wireless communication system 10 according to a first exemplary embodiment of the present invention. The wireless communication system 10 includes a first base station 12, a second base station 14 and a wireless terminal 16. The wireless communication system is, for example, an LTE system.

The first base station 12 and the second base station 14 perform transmission of wireless signals in cooperation with each other, by the use of signaling through a wired transmission line 18. That is, in the wireless communication system 10, multi-base-station cooperative transmission (for example, CoMP) is performed.

In FIG. 1, the wireless terminal 16 is located in an area (a cell edge) where the cell of the first base station 12 overlaps with that of the second base station 14. In the present case, the wireless terminal 16 is currently served by the first base station 12. That is, in that situation, the first base station 12 is the “current serving base station”, and the second base station 14 is the “neighboring base station”. As described above, the first base station 12 and the second base station 14 are performing multi-base-station cooperative transmission, and accordingly, the wireless terminal 16 receives the same data from both of the first base station 12 and the second base station 14.

From each of the base stations, the wireless terminal 16 receives broadcast information at least. The broadcast information includes at least information about transmission powers Pt_A and Pt_B and about locations PA and PB, of the respective base stations (if necessary, information about a transmission antenna gain Gt, to be described later, may also be included). The transmission powers Pt_A and Pt_B are transmission powers currently set to the respective base stations. The locations PA and PB represent the locations (for example, the latitudes and the longitudes) of the respective base stations. Here, broadcast information other than that described above, information other than broadcast information and transmission information sent from the wireless terminal 16 to each of the base stations do not directly concern the present exemplary embodiment. Therefore, descriptions of those sorts of information will be omitted here.

Figure 2:
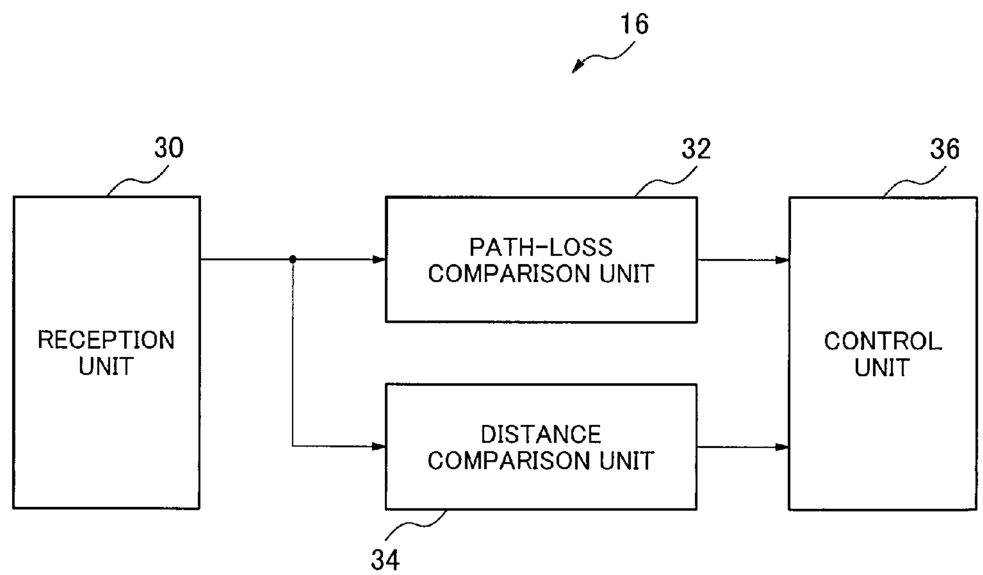

FIG. 2 is a block diagram showing an example of a configuration of the wireless terminal 16 shown in FIG. 1.

The wireless terminal 16 comprises a reception unit 30, a path-loss comparison unit 32 (path-loss comparison means), a distance comparison unit 34 (distance comparison means) and a control unit 36 (control means).

The reception unit 30 receives radio waves from the first base station 12 and the second base station 14. The reception unit 30 measures the received signal strength of a radio wave from the first base station 12, RSSI_A, and the received signal strength of a radio wave from the second base station 14, RSSI_B, and outputs the measurement results to the path-loss comparison unit 32. Here, RSSI is the abbreviation of Received Signal Strength Indicator. If necessary, the reception unit 30 may also output information about the reception antenna gain Gr, to be described later, to the path-loss comparison unit 32.

The path-loss comparison unit 32 calculates the path loss between the wireless terminal 16 and the first base station 12, PL_A, and the path loss between the wireless terminal 16 and the second base station 14, PL_B. If the wireless terminal 16 is currently served by the first base station 12, the path loss PL_A corresponds to a "first path loss" defined as the path loss between the wireless terminal 16 and its current serving base station, and the path loss PL_B corresponds to a "second path loss" defined as the path loss between the wireless terminal 16 and the neighboring base station. Here, the term "path loss" is referred to as the radio wave propagation loss between a base station and a wireless terminal.

For example, if the transmission power of a base station is represented by Pt [dBm], the received signal strength at a wireless terminal by RSSI [dBm], the transmission antenna gain by Gt [dBi] and the reception antenna gain by Gr [dBi], the path loss PL [dB] is expressed by an equation 1 shown below.

$$PL = Pt - RSSI + Gt + Gr \quad \text{(equation 1)}$$

The path-loss comparison unit 32 acquires the parameters necessary for the above-described calculation, using a predetermined method. For example, the path-loss comparison unit 32 may acquire the transmission powers Pt_A and Pt_B through broadcast information. The path-loss comparison unit 32 may acquire the received signal strengths RSSI_A and RSSI_B from the reception unit 30.

By substituting the acquired parameters into the equation 1 described above, the path-loss comparison unit 32 calculates the path losses PL_A and PL_B.

The path-loss comparison unit 32 compares the path losses PL_A and PL_B with each other, and outputs the comparison result to the control unit 36.

The distance comparison unit 34 compares the distance between the wireless terminal 16 and the first base station 12, Dis_A, with the distance between the wireless terminal 16 and the second base station 14, Dis_B. If the wireless terminal 16 is currently served by the first base station 12, the distance Dis_A corresponds to a "first distance" defined as the distance between the wireless terminal 16 and its current serving base station, and the distance Dis_B corresponds to a "second distance" defined as the distance between the wireless terminal 16 and the neighboring base station. The distance comparison unit 34 outputs the comparison result to the control unit 36.

The distance Dis_A is calculated on the basis of the location of the first base station 12, PA, (which is contained in broadcast information) and the location of the wireless terminal 16, PT. The distance Dis_B is calculated on the basis of the location of the second base station 14, PB, (which is contained in broadcast information) and the location of the wireless terminal 16, PT.

Here, the location PT is detected by means of a predetermined position detection method, for example, position detection by GPS (Global Positioning System).

The control unit 36 receives the comparison result from the path-loss comparison unit 32 and that by the distance comparison unit 34. If at least either a condition that the path loss PL_B is smaller than the path loss PL_A or a condition that the distance Dis_B is shorter than the distance Dis_A is satisfied, the control unit 36 performs handover from the first base station 12 (the current serving base station) to the second base station 14 (the neighboring base station).

Here, other functions of the wireless terminal 16 (such as a transmission function, an information processing function and a display function) do not directly concern the process described in the present exemplary embodiment. Therefore, of those functions, illustrations in FIG. 2 and descriptions will be omitted here.

Figure 3:
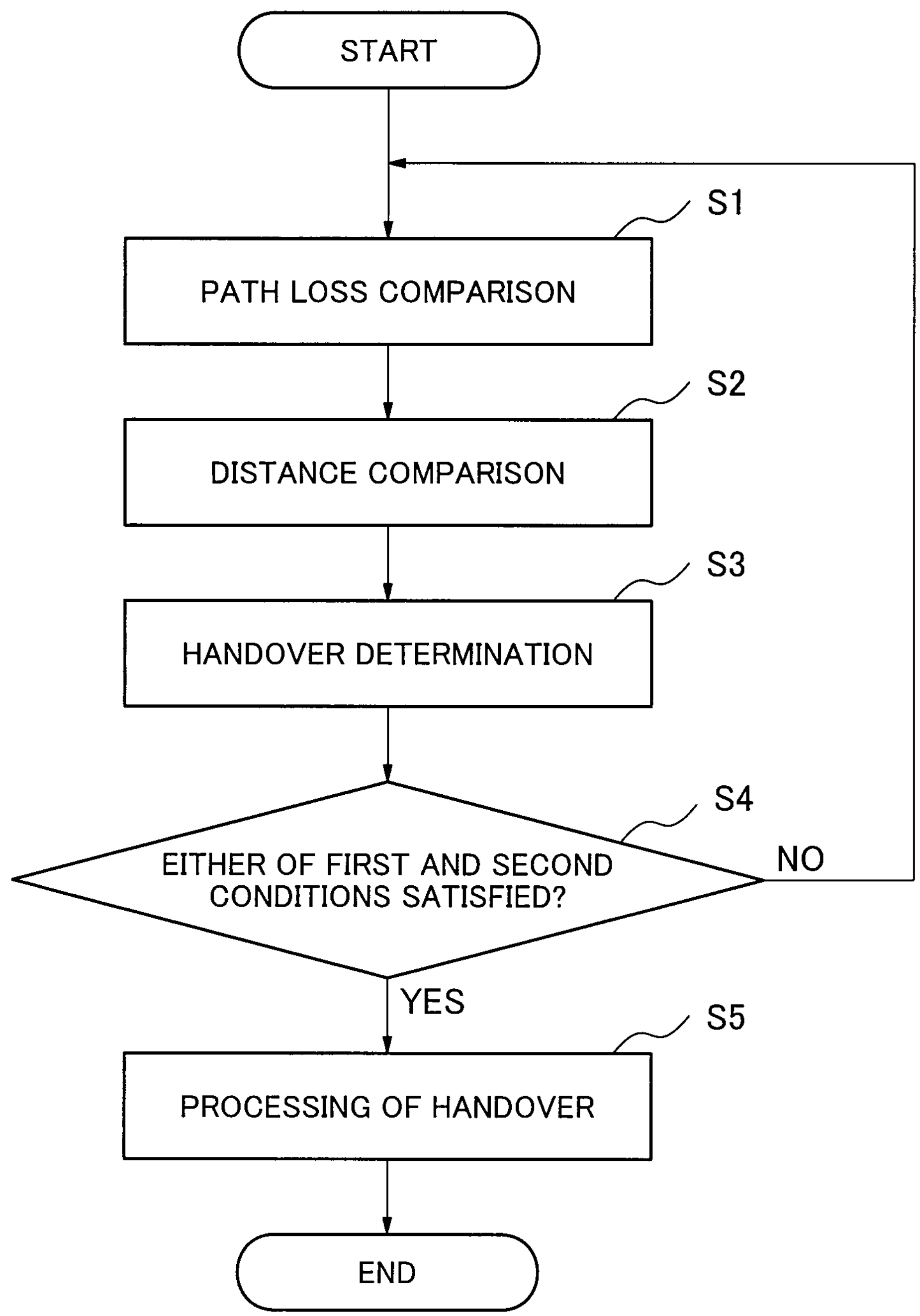
FIG. 3 a flow chart showing an example of operation of a wireless terminal

FIG. 3 is a flow chart showing an example of operation of the wireless terminal 16.

The first base station 12 and the second base station 14 can perform down link transmission to the wireless terminal 16 in a manner of multi-base-station cooperative transmission. It is further assumed that the wireless terminal 16 is currently served by the first base station 12. Accordingly, in the present case, the path loss PL_A corresponds to the "first path loss", and the path loss PL_B to the "second path loss". It is then assumed that, at the initial stage before the process shown by the flow chart of FIG. 3 is performed, a precondition "the first path loss is smaller than the second path loss, and at the same time, the first distance is shorter than the second distance" is satisfied. Specifically, the precondition is expressed as satisfying both path loss PL_A<path loss PL_B and distance Dis_A<distance Dis_B.

The path-loss comparison unit 32 compares the path loss PL_A with the path loss PL_B (step S1). The methods for calculating the path losses PL_A and PL_B are as described above. The path-loss comparison unit 32 outputs the comparison result to the control unit 36.

The distance comparison unit 34 compares the distance Dis_A with the distance Dis_B (step S2). The methods for calculating the distances Dis_A and Dis_B are as described above. The distance comparison unit 34 outputs the comparison result to the control unit 36.

On the basis of the both comparison results, the control unit 36 performs determination whether handover is performed (step S3).

In general, if at least either a first condition that the second path loss is smaller than the first path loss or a second condition that the second distance is shorter than the first distance is satisfied, the control unit 36 performs handover from the current serving base station to the neighboring base station.

Specifically, the control unit 36 determines whether or not at least either the condition that the path loss PL_B is smaller than the path loss PL_A (the first condition: path loss PL_A>path loss PL_B) or the condition that the distance Dis_B is shorter than the distance Dis_A (the second condition: distance Dis_A>distance Dis_B) is satisfied. In other words, the control unit 36 determines whether or not the above-described "precondition" has been broken.

Here, the first and second conditions are evenly taken into account. Accordingly, the condition for executing handover is that at least either of the first and second conditions is satisfied, as described above. When checks on satisfaction of respective ones of the two conditions are performed one after the other, there is no particular restriction on the order of the checks on condition satisfaction. Further, when condition satisfaction has been confirmed in one of the checks performed first, it does not raise any problem even if the next check on satisfaction of the other condition is not performed.

If at least either of the first and second conditions is satisfied (if determined YES in a step S4/if the "precondition" is broken), the control unit 36 performs handover from the first base station 12 to the second base station 14 (step S5). That is, the control unit 36 changes the base station to serve the wireless terminal 16 from the first base station 12 to the second base station 14.

On the other hand, if neither of the first and second conditions is satisfied (if determined NO in the step S4/if the "precondition" is not broken), the control unit 36 does not perform handover from the first base station 12 to the second base station 14. That is, the control unit 36 keeps setting the base station to serve the wireless terminal 16 to be the first base station 12.

As has been described above, in the present exemplary embodiment, in the environment where the first base station 12 and the second base station 14 perform down link transmission in a manner of multi-base-station cooperative transmission, if the environment becomes one where uplink signals reach in a better condition to the second base station 14 (neighboring base station) than to the first base station 12 (current serving base station), handover from the current serving base station to the neighboring base station is certainly performed. As a result, it becomes possible to perform uplink transmission to a base station to which signals reach in a better condition.

Accordingly, the level of uplink RSSI becomes higher even if the transmission power is kept the same as that before the handover, and consequently, it becomes possible to increase the upper limit value of uplink SINR. As a result, it becomes possible to improve the uplink throughput.

In an alternative case where the uplink throughput is kept the same as that before the handover, it becomes possible to perform uplink transmission with a lower transmission power (with reduced power consumption of the terminal) by setting the upper limit value of uplink SINR at a lower value than that before the handover.

That is, according to the present exemplary embodiment, it becomes possible to achieve at least either improvement in the upload throughput or reduction in power consumption at the wireless terminal. In other words, according to the present exemplary embodiment, it becomes possible to solve the demerit of multi-base-station cooperative transmission (decrease in the uplink throughput or increase in power consumption of the wireless terminal 16), while maintaining the merit of multi-base-station cooperative transmission (improvement in the downlink throughput at a cell edge).

By the way, it infrequently occurs that values of the transmission powers Pt_A and Pt_B are different from the values of powers actually transmitted by the respective base stations. Further, by the influence of a wireless propagation environment, it may infrequently occur that a phenomenon where the downlink signal strength (RSSI) becomes higher for a more distant base station than for a less distant base station. Therefore, in order to eliminate more surely the influence of phenomena which infrequently occur, such as described above, it is preferable to determine the condition for executing handover to be "if both of the first and second conditions are satisfied".

When the handover has been executed, and accordingly, the serving base station has been changed (that is, when the second base station 14 has become the current serving base station, and the first base station 12 has become a neighboring base station), the first and second conditions after the handover correspond to the inverse ones of the respective ones before the handover. Specifically, in the case of the present exemplary embodiment, the first and second conditions after the handover become, respectively, "path loss PL_A<path loss PL_B" and "distance Dis_A<distance Dis_B".

In FIG. 3, the illustration is given for the operation in the case of performing handover only once, in order to make the description clearer. However, it is obvious that handover may be performed repeatedly.

In the case of performing handover repeatedly, when determination of the next handover is performed in a state where only either of the first and second conditions has already been satisfied (that is, when the process shown in FIG. 3 is executed again), the precondition has become different from that at the time of the ordinary determination of handover (the first handover in FIG. 3). In contrast to that the ordinary precondition is "in both path loss and distance, the serving base station is smaller than the neighboring base station", the precondition after the first handover has been performed in the above-mentioned state becomes "in either path loss or distance, the neighboring base station is smaller than the serving base station". Accordingly, when the process shown in FIG. 3 is performed under the latter precondition, the next handover is immediately executed because the condition for handover that either of the first and second conditions is satisfied has already been satisfied by the precondition. That is, it is likely that a so-called "ping-pong phenomenon", where handovers are continually executed, occurs.

In order to avoid the above-described ping-pong phenomenon, the procedure may be modified to be one which makes the next determination of handover (that is, the process shown in FIG. 3) wait for a certain time period (for example, 10 seconds) since execution of the preceding handover until the precondition again becomes "in both path loss and distance, the serving base station is smaller than the neighboring base station".

Alternatively, the procedure may be modified to be one where the number of handovers between specific base stations per unit time is counted, and if the count value has exceeded a predetermined threshold value (for example, three), the next determination of handover (that is, the process shown in FIG. 3) is made to wait for a certain time period (for example, 10 seconds).

Figure 4:
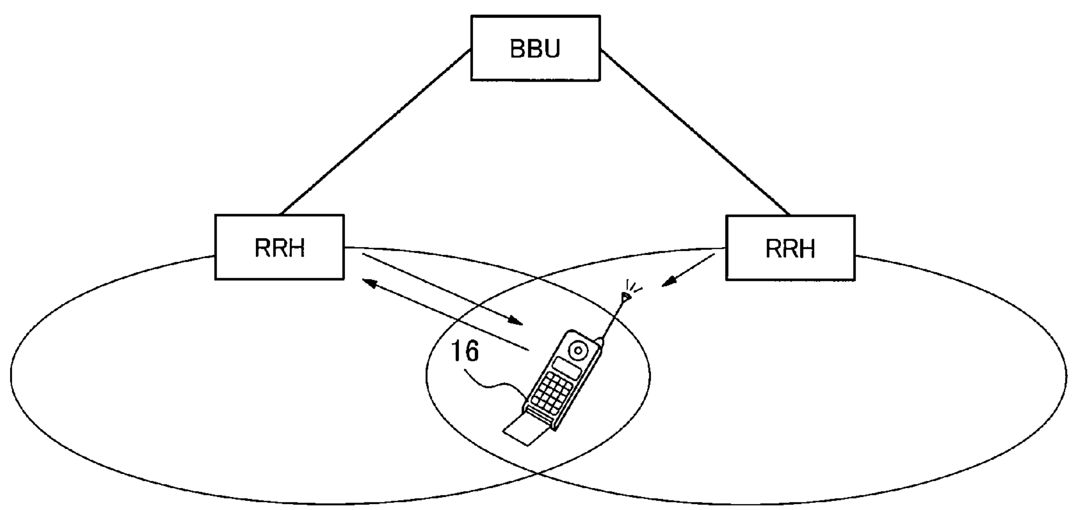
FIG. 4 a system configuration diagram showing an example of another wireless communication system to which the first exemplary embodiment is applied FIG. 5 a block diagram showing an example of a configuration of a wireless terminal according to a second exemplary embodiment of the present invention FIG. 6 a block diagram showing an example of a configuration of a handover program stored in a memory shown in FIG. 5

The exemplary embodiment described above is not limited to an "integrated type base station device (a device comprising a baseband function unit and a transmission amplifier function unit)" such as shown in FIG. 1, but can be applied also to a "separated type base station device (a device consisting of a baseband function unit BBU and an amplifier function unit RRH which are separated from each other)" such as shown in FIG. 4, for example. In FIG. 4, BBU is the abbreviation of Base Band Unit, and RRH is the abbreviation of Remote Radio Head.

The above description has been given taking as an example the case where the number of base stations to perform multi-base-station cooperative transmission is two, in order to make the description clearer, but the number may be three or more. For example, when the number of base stations to perform multi-base-station cooperative transmission is "3", one of them is the serving base station, and the number of neighboring base stations (candidate base stations for handover) is two. In that case, a more preferable neighboring base station may be selected between the two. Specifically, the path loss between the wireless terminal 16 and a third base station corresponding to the second neighboring base station is defined as PL_C, and the distance between the wireless terminal 16 and the third base station is defined as Dis_C. Then, for example, if a condition "PL_A>PL_B>PL_C" is satisfied, the wireless terminal 16 is handed over from the first base station 12, which is the current serving station, to the third base station. On the other hand, for example, if a condition "Dis_A>Dis_C>Dis_B" is satisfied, the wireless terminal 16 is handed over from the first base station 12, which is the current serving station, to the second base station 14.

A wireless communication system to which the first exemplary embodiment described above is applied is not limited to an LTE system, but may be another type of wireless communication system (for example, a WiMAX system).

Calculation of the path losses (PL_A and PL_B) is not limited to that by the equation 1 described above, but may be performed using another method.

In FIG. 3, a state where the wireless terminal 16 has the reception unit 30 integrated within it is shown. However, the functions of the reception unit 30 (the functions to receive radio waves from the base stations and provide RSSI values to the path-loss comparison unit 32, and to provide broadcast information including locations of the base stations to the distance comparison unit 34) may be arranged outside the wireless terminal 16. That is, what is required of the wireless terminal 16 is to comprise at least the path-loss comparison unit 32, the distance comparison unit 34 and the control unit 36, and accordingly, the reception unit 30 is not an essential constituent element of the wireless terminal 16.

Second Exemplary Embodiment

Figure 5:
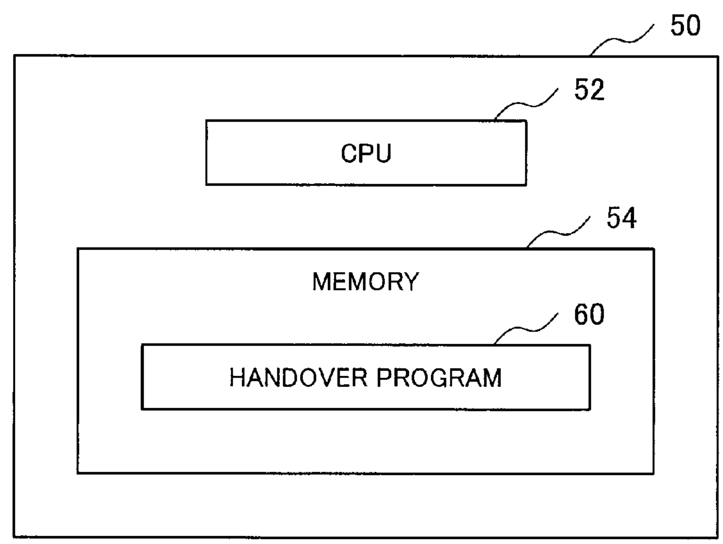

FIG. 5 is a block diagram showing an example of a configuration of a wireless terminal 50 according to a second exemplary embodiment of the present invention. The wireless terminal 50 comprises a CPU (Central Processing Unit) 52 and a memory 54.

The memory 54 stores a handover program 60. The CPU 52 executes the handover program 60. What can be mentioned as an example of the memory 54 is a non-transitory storage means such as, for example, a ROM (Read Only Memory), a hard disk, a removable medium or a removable disk.

Figure 6:
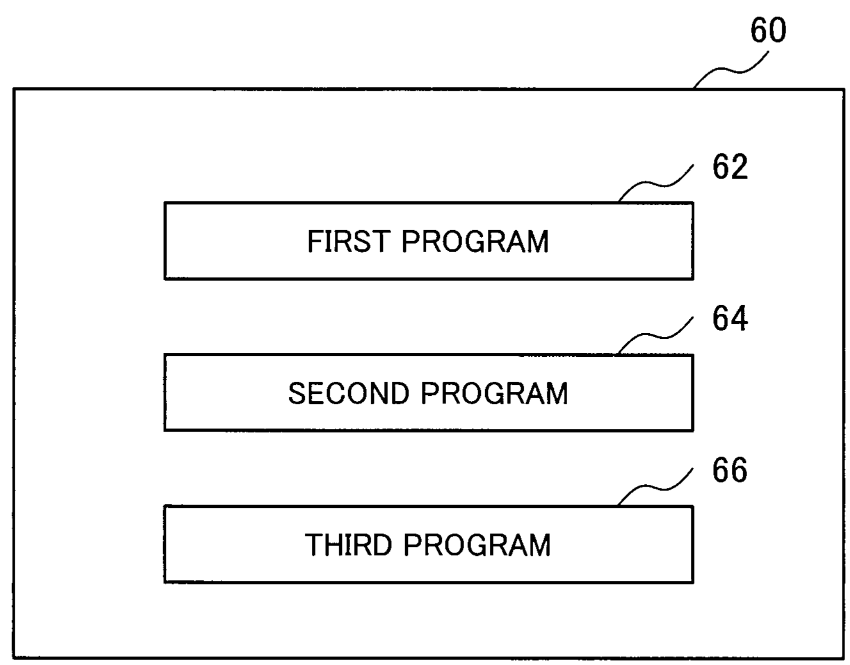

FIG. 6 is a block diagram showing an example of a configuration of the handover program 60. The handover program 60 comprises a first program 62, a second program 64 and a third program 66.

The first program 62 is a program for performing the process of the step S1 in FIG. 3.

The second program 64 is a program for performing the process of the step S2 in FIG. 3.

The third program 66 is a program for performing the processes of the steps S3 to S5 in FIG. 3.

For the same reason as that described in the first exemplary embodiment, according to the second exemplary embodiment described above, it becomes possible, in a wireless communication system including a wireless terminal communicating with both the current serving base station and its neighboring base station which are capable of performing transmission in a manner of multi-base-station cooperative transmission, to achieve at least either of improvement in the uplink throughput and reduction in power consumption at the wireless terminal.

The present invention has been described above, with reference to the exemplary embodiments, but the present invention is not limited to the above-described exemplary embodiments. To the configurations and details of the present invention, various changes which can be understood by those skilled in the art may be made within the scope of the present invention.

The present application is based upon and claims the benefit from Japanese Patent Application No. 2013-034648, filed on Feb. 25, 2013, the disclosure of which is incorporated herein in its entirety by reference.

REFERENCE SIGNS LIST

10 wireless communication system
12 first base station
14 second base station
16 wireless terminal
18 wired transmission line
30 reception unit
32 path-loss comparison unit
34 distance comparison unit
36 control unit
50 wireless terminal
52 CPU
54 memory
60 handover program
62 first program
64 second program
66 third program

The invention claimed is:

1. A wireless terminal configured to communicate with a first base station and a second base station, the wireless terminal comprising:

a path loss comparison unit configured to compare a first path loss which comprises a path loss between the wireless terminal and the first base station with a second path loss which comprises a path loss between the wireless terminal and the second base station;

a distance comparison unit configured to compare i) a first distance which comprises a distance between the wireless terminal and the first base station with ii) a second distance which comprises a distance between the wireless terminal and the second base station; and a control unit configured to perform handover from the first base station to the second base station, if the second distance is shorter than the first distance and the second path loss is smaller than the first path loss when multi base station cooperative transmission is performed, wherein the wireless terminal is not a base station and is separate from the first base station and the second base station, and wherein a next handover is made to wait for a certain time period since the handover to the second base station is performed until the second base station is smaller in both path loss and distance, than at least one neighbor base station.

2. The wireless terminal according to claim 1, wherein the first path loss is calculated based on a transmission power of the first base station and a received signal strength of a radio wave from the first base station measured at the wireless terminal, and wherein the second path loss is calculated based on a transmission power of the second base station and a received signal strength of a radio wave from the second base station measured at the wireless terminal.

3. The wireless terminal according to claim 2, wherein information about the transmission power of the first base station is contained in first broadcast information sent from the first base station, and wherein information about the transmission power of the second base station is contained in second broadcast information sent from the second base station.

4. The wireless terminal according to claim 1, wherein the first distance is calculated based on a location of the first base station and a location of the wireless terminal, and wherein the second distance is calculated based on a location of the second base station and a location of the wireless terminal.

5. The wireless terminal according to claim 4, wherein information about the location of the first base station is contained in first broadcast information sent from the first base station, and wherein information about the location of the second base station is contained in second broadcast information sent from the second base station.

6. A method for a wireless terminal configured to communicate with a first base station and a second base station, the method comprising:

comparing a first path loss which comprises a path loss between the wireless terminal and the first base station with a second path loss which comprises a path loss between the wireless terminal and the second base station;

comparing a first distance which comprises a distance between the wireless terminal and the first base station with ii) a second distance which comprises a distance between the wireless terminal and the second base station; and performing handover from the first base station to the second base station, if the second distance is shorter than the first distance and the second path loss is smaller than the first path loss when multi base station cooperative transmission is performed, wherein the wireless terminal is not a base station and is separate from the first base station and the second base station, and wherein a next handover is made to wait for a certain time period since the handover to the second base station is performed until the second base station is smaller in both path loss and distance, than at least one neighbor base station.

7. The method according to claim 6, wherein the first path loss is calculated based on a transmission power of the first base station and a received signal strength of a radio wave from the first base station measured at the wireless terminal, and wherein the second path loss is calculated based on a transmission power of the second base station and a received signal strength of a radio wave from the first base station measured at the wireless terminal.

8. The method according to claim 7, wherein information about the transmission power of the first base station is contained in first broadcast information sent from the first base station, and wherein information about the transmission power of the second base station is contained in second broadcast information sent from the second base station.

* * * * *